United States Patent [19]

Donigian et al.

[11] Patent Number: 5,783,038
[45] Date of Patent: Jul. 21, 1998

[54] INK JET RECORDING PAPER INCORPORATING NOVEL PRECIPITATED CALCIUM CARBONATE PIGMENT

[75] Inventors: Douglas Ward Donigian, Bethlehem; Robert Kenneth Resnik, Easton; Michael Gregory McFadden, Riegelsville, all of Pa.

[73] Assignee: Minerals Technologies, Inc., New York, N.Y.

[21] Appl. No.: 837,191

[22] Filed: Apr. 14, 1997

Related U.S. Application Data

[62] Division of Ser. No. 407,422, Mar. 17, 1995, Pat. No. 5,643,631.

[51] Int. Cl.$^6$ .................................................... D21F 11/00
[52] U.S. Cl. .................. 162/135; 162/158; 162/181.2; 162/164.1; 162/168.1; 106/287.29; 106/465; 106/503; 423/432
[58] Field of Search .................. 106/464, 465, 106/287.29, 503; 162/135, 164.1, 168.1, 181.2, 158; 423/430, 432

[56] References Cited

U.S. PATENT DOCUMENTS 4,892,590   1/1990   Gill et al. ............................ 106/214

*Primary Examiner*—Erma Cameron
*Attorney, Agent, or Firm*—Marvin J. Powell; Terry B. Morris

[57] ABSTRACT

An improved thermal ink jet recording paper, incorporating heat aged precipitated calcium carbonate ("PCC") and a binder, is disclosed. Heat aging the PCC in the presence of an organophosphonate produces discrete particles of PCC with a surface morphology and chemistry that enhances the ability of the PCC to bind to ink jet ink without binding so strongly that the color of the ink is changed. Ink jet recording papers incorporating the PCC and binders of the present invention have reduced feathering, spreading, and penetration or backside showthrough, as well as improved optical density, dry time, and water fastness.

3 Claims, No Drawings

INK JET RECORDING PAPER INCORPORATING NOVEL PRECIPITATED CALCIUM CARBONATE PIGMENT

This is a divisional of application Ser. No. 08/407,422 filed Mar. 17, 1995 now U.S. Pat. No. 5,643,631.

FIELD OF THE INVENTION

The present invention relates to novel heat aged and milled precipitated calcium carbonate pigments for use in ink jet recording papers. More particularly, the present invention relates to an ink jet recording paper which incorporates such pigments and at least one water soluble binder to impart enhanced print quality. The invention also relates to methods of applying these components to paper, and to methods of producing the novel pigments.

BACKGROUND OF THE INVENTION

The thermal ink jet process applies a dilute aqueous ink onto the surface of a paper by heating a small volume of the ink in a small chamber with an orifice that is directed at the recording paper. The small volume of ink that is heated rapidly reaches its boiling point, and the steam bubble formed propels a tiny drop of liquid ink at the paper, where the drop produces a single dot in a dot matrix that forms a character or image on the sheet. This process requires an ink that is low in solids and high boiling components so that it is capable of boiling rapidly without leaving a residue that can foul the heating element, and clog the orifice. Therefore, up to 96 percent of ink jet printer ink is a mixture of water and low molecular weight glycols. Although such an ink boils quickly when heated to ensure rapid printing, and is not prone to clog, it results in an applied ink that is very mobile and slow to dry. Therefore, good print quality can be obtained only if the ink colorant or dye remains on or near the outer surface of the paper, and does not spread or move from the point at which it was applied.

It is also important that drying occurs rapidly to prevent smearing of the colorant. In printers that are not equipped with heating elements, the water and glycol components of the ink must penetrate into the body of the paper for proper drying of the colorant on the surface. If the colored phase is carried into the paper with the liquid phase as it penetrates into the paper, or if the colorant migrates across the surface of the paper, the quality of the resulting print or image will be poor. Also, dry ink colorant that is not permanently fixed on the paper will blot or run if the printed surface becomes wet or is marked with a highlighter. Therefore, the dry ink should have excellent water and highlighter fastness properties for optimum performance.

In most applications, multipurpose office papers provide inadequate or poor thermal ink jet print quality. This is particularly true where multicolor printing with concomitant superimposed ink applications is utilized. The poor print quality is compounded in printers that apply the colors in one order when the print head moves to the right and the reverse order when the print head moves to the left. Multipurpose office papers often allow the colorant to penetrate into the paper, which results in reduced optical density of the printed image, and increased show through on the reverse side of the paper. Multipurpose office papers that are highly sized prevent liquid penetration, leading to higher ink optical density, but, also, excessive feathering and spreading.

One method of improving thermal ink jet print quality is to apply a material to the paper surface that binds the ink colorant to the surface, but allows the water/glycol liquid phase to pass into the body of the paper, which speeds drying. However, the ink colorant often is an unsaturated or aromatic organic compound, and if the surface material interacts too strongly with the colorant the color of the ink can change. Therefore, a surface material must be obtained that prevents the ink colorant from penetrating the paper, but does not interact so strongly as to effect the colorant, and cause a color change.

Oshima et al., U.S. Pat. No. 4,478,910, discloses a paper base stock that is coated with a high specific surface area colloidal silica pigment and a polyvinyl alcohol binder, where the specific surface area of the colloidal silica is greater than 200 $m^2/g$.

Miyamoto, U.S. Pat. No. 4,576,867, and Kojima et al., U.S. Pat. No. 4,830,911, teach that application of a cationic quaternary ammonium polymer to a paper stock will improve the water fastness of the resulting paper. Application of such a quaternary ammonium polymer in a size press is also disclosed by Malhotra, U.S. Pat. No. 5,223,338. However, high quality, commercial thermal ink jet recording paper is produced with off machine coaters, i.e., the paper is not treated in the size press of the paper making machine, but must be removed and coated in an additional step using a separate coating process.

Precipitated calcium carbonate ("PCC") has been disclosed as a useful pigment or filler in ink jet paper, but is typically included in a long list of compounds that also includes natural ground calcium carbonate, a form of the compound that differs greatly from PCC in its physical and chemical properties; e.g., natural ground calcium carbonate particles are far larger than those found in PCC, and are normally anionic, whereas PCC is naturally cationic.

Kondo et al., U.S. Pat. No. 5,320,897, describes coating ink jet recording paper with off-the-shelf pigments and a water soluble binder. The pigments which are disclosed as being useful have an apparent specific gravity in the range of 0.10 to 0.50 $g/cm^3$, and produce a paper with a water contact angle of 45° to 100°.

Tsukisaka et al., U.S. Pat. No. 5,007,964, disclose a generic precipitation method incorporating a chelating agent to obtain a porous agglomeration of chain like PCC particles with a BET specific surface area in the range of 25 to 55 $m^2/g$ for use in a recording paper. Particles with a BET specific surface area of greater than 55 $m^2/g$, are disclosed as being undesirable because they have a higher density, are not porous, and exhibit a low ability to absorb oil and water. It is further disclosed that PCC can be used as a paste, or as a powder obtained by pulverizing the dried paste, which is disclosed as not affecting the agglomeration of the particles.

Kunesh et al., U.S. Pat. No. 5,215,734, disclose an accelerated heat aging process for PCC that produces crystals with a specific surface area of about 3 to about 15 $m^2/g$ and an average discrete particle size of about 0.2 to about 0.9 μm. The PCC is used to improve the optical properties of paper.

In view of the above, there is nothing in the prior art to suggest how to improve the print quality of ink jet recording paper. The present invention provides one such solution to this problem.

SUMMARY OF THE INVENTION

The present invention relates to an ink jet recording paper with enhanced properties that incorporates novel heat aged and/or milled precipitated calcium carbonate pigments and a binder. The heat aged PCC is prepared by carbonating a slurry of calcium hydroxide to form a slurry of precipitated calcium carbonate, screening the slurry to remove impurities, adding an organophosphonate compound, such as ethanolamine bis-(methylenephosphonic acid), to the slurry, and heat aging the PCC slurry in the presence of the organophosphonate to produce an improved pigment for ink jet recording paper.

The ink jet recording paper of the present invention is produced by coating at least one side of a paper base stock with a coating comprising heat aged and/or milled PCC and a binder to form the ink jet recording paper. The heat aged and/or milled precipitated calcium carbonate is made by carbonating a slurry of calcium hydroxide, heat aging the PCC in the presence of an organophosphonate compound and/or milling the PCC to produce discrete particles of PCC with a surface morphology and chemistry that enhances the ability of the PCC to bind to the ink jet printer ink colorant.

DETAILED DESCRIPTION OF THE INVENTION

An ink jet recording paper has been obtained that provides full color ink jet print quality that approaches or surpasses that of the best ink jet specialty paper at a greatly reduced price. The selection of PCC particle size, surface area, surface chemistry, and degree of aggregation, and its combination with an appropriate formulation binder allows each thermal ink jet print characteristic to be individually adjusted and optimized.

The cationic PCCs of the present invention bind ink colorants without the use of expensive cationic resins, and can be manufactured on-site at the paper mill, so that, unlike silica, they do not need to be dried, shipped, and then rewetted for use. The present formulations are designed for application in a metering size press, such as those installed on large, low unit cost paper machines. Therefore, the PCC compositions of the present invention can be applied as part of the paper making operation, rather than as a separate, additional step after normal papermaking operations are completed that increases the cost of the process and the finished product. As a metered size press application is typically two sided, both sides of a paper coated on such a press are available for printing, rather than the single sided coating that is found in expensive, high quality commercial papers. Although polyvinyl alcohol is a preferred binder in the present invention, treating a ink jet recording paper with heat aged and/or milled PCC provides a significant improvement in print quality with lower cost binders. Finally, the present formulations provide a paper that is still suitable for photocopying, which allows multiple uses of the paper.

PCC is normally produced by bubbling a gas containing carbon dioxide through an aqueous suspension of calcium hydroxide. Other inorganic materials, in particular, inorganic materials containing aluminum, such as alum, can be coprecipitated with PCC, or can be precipitated onto the surface of the PCC precipitate. It has been unexpectedly discovered, however, that when such a PCC is heat aged and/or milled, treated with an appropriate binder, and then used in a composition for treating thermal ink jet recording paper, a high quality ink jet recording paper is obtained, which provides a print quality that compares favorably with that of high cost, commercial, silica coated thermal ink jet papers, but at a greatly reduced cost.

The heat aging and milling processes produce discrete particles of PCC with a surface morphology and chemistry that enhances the ability of the PCC to bind to the ink jet ink colorant without binding so strongly that the color of the ink is changed. Ink jet recording papers incorporating the PCC and binders of the present invention have been produced that are superior to multipurpose office papers with reduced feathering, spreading, and penetration or backside showthrough, as well as improved optical density, dry time, and water fastness.

The PCCs of the present invention are produced by the conventional precipitation method of introducing a gas containing carbon dioxide into a suspension of calcium hydroxide. The calcium carbonate precipitate is then heat aged and/or milled before use. The print quality of an ink jet recording paper incorporating such a PCC is controlled by the state of aggregation of the particles and the surface chemistry of the pigment and the binder. The chemical nature of the pigment surface is controlled by the specific synthetic pathway and post synthesis treatment of the pigment.

A PCC particularly useful in the present invention is prepared by a process which comprises introducing carbon dioxide into an aqueous slurry of calcium hydroxide at a temperature of from about 7° to about 18° C. The slurry contains from about 0.02 to 1 weight percent, based on the calcium carbonate equivalent of the calcium hydroxide in the reaction slurry, of an anionic organopolyphosphonate polyelectrolyte (typically, BRIQUEST® 221-50A, ethanolamine bis-(methylenephosphonic acid)), Albright & Wilson Americas, Inc., Richmond, Va.) and from 0 to 10 weight percent of aluminum sulfate octadecahydrate $(Al_2SO_4.18H_2O)$. The introduction of carbon dioxide is continued until precipitation of the calcium carbonate is substantially complete. This typically occurs when the conductivity of the carbonated slurry reaches a minimum at a pH of about 10 to 11.

Except for the addition of aluminum sulfate octadecahydrate, the process to this point is essentially that of U.S. Pat. No. 4,367,207, the teachings of which are incorporated herein by reference. The addition of aluminum sulfate octadecahydrate is disclosed in U.S. Pat. No. 4,892,590, the teachings of which are also incorporated herein by reference.

Once a PCC of the desired particle size and specific surface area is obtained, the PCC is heat-aged or milled to obtain the PCC characteristics required for a high-quality, low cost ink jet recording paper.

Milling breaks pigment aggregates into individual particles, which exposes PCC surfaces that were joined, and are chemically different from the aggregate surface. Milling is typically performed on a PCC with a scalenohedral, acicular, prismatic, or rhombohedral morphology. Heat aging is normally performed on a rhombohedral or prismatic PCC, and not only separates aggregates, but also involves further precipitation on the particle surface. It is believed that the newly precipitated material may be chemically different from the original surface material; e.g., the surface of a heat aged or milled PCC may have a higher calcium-magnesium ratio.

Conventional heat aging, also known as Ostwald ripening, is a process whereby crystals such as calcium carbonate, initially at a higher internal energy state, and having relatively high phase solubilities, undergo a phase transformation by dissolving and redepositing on crystals at a lower internal energy state. The process results in a final crystal product characterized by greater perfection of the crystal lattice structure, a narrower particle size distribution, a greater degree of particle discreteness, and a lower surface energy.

In the present invention, heat aging of PCC starts by ending the reaction of carbon dioxide and calcium hydroxide when the conductivity of the slurry reaches a minimum, which is typically at a pH of about 10–11. The PCC is then screened to remove impurities, and up to about 1 percent by weight of an organophosphonate, based on the weight of PCC, is added to control the extent or degree of heat aging. Other chemical agents that are surface active with regard to calcium carbonate will also serve as well as organophosphonates to control the extent or degree of heat aging. Such agents include, but are not limited to the following, sodium polyphosphates, sodium silicates, sodium polyacrylates, various carboxylic acids, such as mono, di, tri, and polycarboxylic acids, and their salts, various polysaccharides, and various gums with repeating carboxylic acid functionalities. The slurry is then heated to a temperature of at least about 75° C. and preferably about 80° C. or higher to heat age the PCC particles. The heat aging step is conducted for up to about 10 hours or more, depending upon the temperature. At temperatures of about 80° to 85° C., the heating is conducted for about 2 to 5 hours. The pH of the slurry rises to approximately 10.5 due to the presence of unreacted calcium hydroxide. The aging reaction is then monitored by measuring the surface area of the PCC at hourly intervals. The heat aged PCC that is recovered as the final product of the process has a rhombohedral or prismatic morphology and a specific surface area of about 60 to about 100 $m^2/g$, preferably about 65 to about 95 $m^2/g$, and most preferably from about 80 to 90 $m^2/g$.

The organophosphonates employed in the present invention are organopolyphosphonates of varying molecular weights commonly used as scale inhibitors, sequesterants, deflocculants, and detergent promoters. Such organophosphonates include, but are not limited to, nitrilo tris (methylene phosphonic acid), ethylenediaminetetra (methylene phosphonic acid), diethylenetriaminepenta (methylene phosphonic acid), hydroxy ethane-1,1-diphosphonic acid, ethanolamine, ethanolamine bis (methylenephosphonic acid), N,N-dimethylene phosphonic acid, and hexamethylenediaminetetra (methylene phosphonic acid). The preferred organophosphonate is ethanolamine bis(methylenephosphonic acid).

The milling of a calcium carbonate may be carried out in either a wet or dry milling process in, for example, a conventional ball mill, jet mill, micro mill, or media mill. The preferred milling is carried out by introducing an aqueous slurry of PCC into a media mill containing glass media of a size from about 0.7 to 0.9 mm. The media mill is equipped with mechanical agitation, and the preferred weight percent solids of the PCC slurry is from about 10 to 30 percent, based on the total weight of the PCC and the water. When media milling is typically performed on PCC with a scalenohedral morphology, a PCC with a specific surface area of from about 10 to about 40 $m^2/g$, preferably from about 15 to about 30 $m^2/g$, and a less elongated crystal shape is produced.

Examples of binders useful for coating compositions for ink jet recording paper are those heretofore conventionally used in the art, and include polyvinyl alcohol ("PVOH") and derivatives thereof, oxidized starch, etherified starch, esterified starch, dextrin and like starches, carboxymethylcellulose, hydroxyethylcellulose and like cellulose derivatives, casein, gelatin, soybean protein, maleic anhydride resin, lattices of usual styrenebutadiene copolymer, methyl methacrylate-butadiene copolymer and like conjugated diene polymers or copolymers, and lattices of acrylate and methacrylate polymers or copolymers and like acrylic polymers, and latex. When required, the coating composition may have further incorporated therein in an amount conventionally used in the art of conventional pigment dispersants, tackifiers, flowability modifiers, defoaming agents, foaming inhibitors, release agents, coloring agents, and the like.

Ink jet recording papers incorporating the PCC formulations of the present invention have been prepared and tested. The following is a summary of the procedures and testing methods used. Once a PCC is produced, the entire testing process can be categorized into four areas; pigment preparation, formulation with binder, paper coating and processing, and testing. Specific details for each of these procedures are given below.

Pigment Preparation

Pigments to be tested are typically in the form of a slurry or a filter cake. Samples in the form of a slurry are concentrated to the desired solids by vacuum filtration. In some instances, such as with a media milled PCC with a specific surface area of about 10 to 35 $m^2/g$, the slurry solids are not further altered in order to duplicate trial conditions. Once the target formulation solids is set, the pigment is diluted, if necessary, with water and thoroughly mixed. The pigment is characterized by particle size distribution (Sedigraph 5100), specific surface area (Flowsorb), viscosity (Brookfield), and morphology by scanning electron microscopy ("SEM").

The surface area of the product was obtained using a Micromeritics Flowsorb II 2300, which employs BET theory with nitrogen as the absorbing gas. The particle size was determined by a sedimentation technique using a Micromeritics Sedigraph Model 5100 on an aqueous dispersion of the product at about 3 percent and using about 0.1 percent carboxylated polyelectrolyte (Daxad 30) as a dispersant.

Formulation

Typical binders are cationic starch (Filmcote-54®, National Starch), polyvinyl alcohol or PVOH (Airvol 107®, Air Products Inc.), and latex (Dow experimental size press latex). When a starch is used as a binder, the dry starch is dispersed in water at about 10–25 percent solids, and then cooked in an automated laboratory cooker at about 195° C. for 50–190 minutes. The resulting viscous starch slurry is combined with the pigment, which has been appropriately prepared to attain the target formulation solids, and mixed thoroughly on a Premier mill with a Cowles type open impeller blade. The formulation is mixed for about 5 minutes until a completely homogenous slurry is obtained, and the resulting formulation is characterized by Brookfield viscosity (10, 20, 50, and 100 r.p.m.) and solids.

Polyvinyl alcohol is prepared in a manner similar to that used for starch. The PVOH is hydrated at about 200° C. in a laboratory cooker for 50–190 minutes at 10 percent solids. For the latex binder (50 percent solids), no preparation is necessary before testing. The formulation of these binders with the pigment is the same as with the starch.

Formulation solids for the tests were in the range of about 20–28 percent, with a typical coating formulation having about 20 percent solids.

Paper Coating

Generally, an unsized base stock with an 81.3–83.0 $g/m^2$ basis weight is used in the tests. The paper is cut into 12×17" sheets and secured to the CSD Drawdown Apparatus, manufactured by CSD Tech International, Inc., of Oldsmar, Fla., which consists of a glass plate (12×17") mounted on metal base with spring clip at the top. A coating formulation is applied with a CSD drawdown rod by placing the rod of choice, which depends on target coat weight, at the top of the paper, adding a thoroughly mixed 10–15 ml sample of the formulation with a 30 ml syringe in a uniform line across the top to the paper, below the rod, and coating the paper by pulling the drawdown rod from top to bottom using light pressure and a constant, steady rate for about 2 seconds.

The coat weight is determine by the stainless steel drawdown rods, which are specifically grooved to deliver a predetermined coating volume to the paper surface. Rods with fewer grooves deliver a heavier coat weight, since the spaces between the grooves are wider. In turn, rods with a greater number of more tightly spaced grooves produce lighter coat weights. Typical coat weights are about 2 to 10 g/m$^2$.

Once a formulation has been applied, the paper is immediately dried with a hand held heat gun for about 30–60 seconds, and then completely dried at room temperature over a period of about 2–24 hours. The dried papers are then cut into 8½×11" sheets for testing.

Paper Testing

Minimum ink jet print quality specifications have been established by Hewlett Packard Corporation ("HP"). Therefore, most tests utilize HP methods to determine the following print characteristics.

Optical density is a measure of the reflection density of an image. A specific test pattern is printed onto the paper, and the optical densities of pure black, composite black, cyan, magenta, and yellow are measured using a reflection densitometer (Macbeth RD918). The resulting optical densities are compared to minimum HP specifications.

Ink spreading and feathering can both decrease the quality of ink jet print. Ink spreading is defined as the growth or widening of printed areas. Feathering is the wicking of ink, which results in fuzzy images. This is measured by analyzing a specific portion of the same printed pattern used for optical density measurements. The specific portion is evaluated for ink area, spreading, and ink perimeter, feathering. The resulting, digitized pattern is quantitated and compared to a commercial premium ink jet paper. The HP test method for ink spreading and feathering was not used in these tests, since the HP test is subjective rather then quantitative.

Ink Dry Time is a measure of the rate of ink absorption into a sheet of paper. A specific test pattern is printed, the image is blotted, and the resulting optical density of the transferred black ink is measured. The results are fitted to a decaying exponential model from HP, and the ink dry time is calculated. The final dry times are compared to minimum criteria set by HP.

Waterfastness is a measure of the amount of colorant transferred from a printed area to an unprinted area when water is applied. The waterfastness test pattern is printed onto the paper, 250 µl of water is applied across the print, and allowed to run over the printed area and adjacent unprinted area. The optical density of the transferred black ink on the unprinted areas is measured. Resulting optical densities are compared to HP standards.

Highlighter smearfastness is the measure of colorant transferred from a printed area to an unprinted area when contacted by two types of highlighters. The specified test pattern is printed onto the paper and, using an alkaline highlighter and an acid highlighter, a perpendicular line is drawn across the test area. The optical density of transferred black ink on unprinted areas is measured and compared to HP minimum criteria.

A color evaluation is performed with a CIELAB system, which uses an Elrephro Datacolor 2000 calorimeter to determine L*, a*, and b* values to score color appearance of cyan, green yellow, blue, magenta, and red printed areas. The results are compared to HP diagrams for color quality.

Toner adhesion is a non-ink jet xerographic test, which measures the degree of toner adhesion to the coating. Toner adhesion is essential for use as a commercial multipurpose paper, which will often be used as a copier paper. Here, a test pattern is copied onto the paper using a Xerox copier, the test areas are creased with a 5 pound roller, and the resulting toner loss patterns are compared to a set of standards. The degree of toner loss is rated from 1, best or no toner loss, to 10, worst or severe toner loss.

In the brightness test, the coated paper is tested for TAPPI brightness using the Technidyne S-4 brightness meter. Results are compared to the uncoated base stock.

EXAMPLES

The following non-limiting examples are merely illustrative of the preferred embodiments of the present invention, and are not to be construed as limiting the invention, the scope of which is defined by the appended claims.

Example 1

The preparation of a slurry of calcium hydroxide was carried out by combining 1 part lime with 5 parts water with mechanical agitation at an initial temperature of 50° C. The slurry was mixed for about 10 minutes, diluted with water to 1 part lime to 15 parts water, and screened with a 60-mesh screen to remove grit.

Calcium carbonate was precipitated from the slurry in a 30 liter, stainless steel reactor equipped with variable speed agitation having two pitched blade turbine impellers, heating and cooling jackets, a stainless steel carbonation tube to direct a carbon dioxide containing gas to the impeller, and a probe for monitoring the pH of the suspension.

Twenty-six (26) liters of calcium hydroxide slurry, prepared as described above, were added to the reactor while stirring at 420 r.p.m. To the slurry was then added 6 grams of organophosphonate (BRIQUEST® 221-50A, ethanolamine bis(methylenephosphonic acid), Albright & Williams Americas, Inc., Richmond Va.), corresponding to 0.1 percent by weight of Briquest based on the calcium carbonate equivalent of the calcium hydroxide slurry. A 1 liter solution containing 95.0 g Al$_2$SO$_4$.16H$_2$O was then added. The slurry temperature was adjusted to 9.5° C., and a gas containing carbon dioxide (28 percent by volume CO$_2$ in air) was introduced at a rate of 2.3 S.C.F.M. while stirring at 615 r.p.m. Carbonation of the calcium hydroxide slurry was continued for 36 minutes with cooling until a minimum slurry conductivity was reached, indicating that the calcium carbonate precipitation was complete. The final temperature of the slurry was 15.8° C. The specific surface area of the resulting calcium carbonate was determined to be 115 m$^2$/g.

Example 2

In the same manner as described in Example 1, calcium carbonate precipitation by carbonation of a calcium hydroxide slurry with a carbon dioxide containing gas in the presence of 0.1 percent by weight Briquest and 3.15 percent by weight Al$_2$SO$_4$.16H$_2$O was carried out with the same equipment. The carbonation was complete in 35 minutes when a minimum conductivity was attained. The final temperature of the slurry was 16.7° C., and the pH was 11.65. The specific surface area of the PCC was 102.3 m$^2$/g. The PCC slurry was screened with a 325 mesh screen, and placed back into the reactor. While stirring, 45 g of BRIQUEST® 221-50A, corresponding to 0.7 percent by weight BRIQUEST®, based on the weight of PCC present, was added. The pH was adjusted to 9.5, the slurry was heated to 80° C., and the PCC was heat aged at 80° C. for 5 hours. The specific surface area of the final product was 82.4 m$^2$/g.

Example 3

In the same manner as described in Example 2, a calcium hydroxide slurry was carbonated in the presence of 0.1 percent by weight BRIQUEST® and 3.15 percent by weight $Al_2SO_4 \cdot 16H_2O$, where both percentages are based on the calcium carbonate equivalent of the calcium hydroxide. The carbonation time was 39 minutes, the final pH was 10.9, and a PCC with a specific surface area of 115.1 $m^2/g$ was obtained. While stirring the mixture, 0.7 percent by weight BRIQUEST® 221-50A, based on the weight of PCC was added. The slurry was screened with a 325 mesh screen, returned to the reactor, and heated to 80° C. for 2 hours. The specific surface area of the final product was 81.6 $m^2/g$.

Example 4

In the same manner as described in Example 2, a calcium hydroxide slurry was carbonated in the presence of 0.7 percent by weight BRIQUEST® 221-50A and 3.15 percent by weight $Al_2SO_4 \cdot 16H_2O$, both percentages based on the calcium carbonate equivalent of calcium hydroxide. The batch time to minimum conductivity was 36 minutes, and the final pH was 11.4. The specific surface are of the PCC was 99.1 $m^2/g$. The slurry was passed through a 325 mesh screen, returned to the reactor, stirred, and 0.15 percent by weight BRIQUEST® 221-50A, based on the weight of PCC, was added. The pH of the slurry was adjusted to 9.5, and the slurry was heated to 80° C. The PCC was heat aged at 80° C. for 2 hours, and a PCC with a specific surface area of 63.8 $m^2/g$ was obtained.

Example 5

A calcium carbonate slurry with a volume of 0.6 l and a solids concentration of 20.2 percent by weight, based on the total weight of calcium carbonate and water, where the calcium carbonate was a scalenohedral PCC with a specific surface area of 11.57 $m^2/g$ and an average particle size of 1.35 μm was placed into a 1.5 l stainless steel media mill containing 1.7 kg of glass beads of 0.7 to 0.9 mm. The media mill was equipped with variable speed mechanical agitation. The slurry was milled for 10 minutes with an agitation speed of 2450 rpm. The milled product had a specific surface area of 15.59 $m^2/g$ and an average particle size of 0.35 microns.

Example 6

A calcium carbonate slurry having a volume of 0.6 l and a solids concentration of 18.7 percent by weight, based on the total weight of the calcium carbonate and the water, where the calcium carbonate was a scalenohedral PCC with a specific surface area of 26.07 $m^2/g$ and an average particle size of 0.88 μm, was placed in a 1.5 l stainless steel media mill equipped with variable speed agitation and 1.7 kg of 0.7 to 0.9 mm glass beads. The slurry was milled for 10 minutes using a 2450 rpm agitation speed. The milled PCC product had a specific surface area of 30.11 $m^2/g$ and an average particle size of 0.26 μm.

The heat aged and media milled PCC's of Examples 1 to 6 were formulated with an appropriate binder, and paper test sheets were coated with 6 $g/m^2$ of the formulation in the manner described above. After drying, the paper hand sheets were tested for true black optical density, composite optical density, spreading, penetration, dry time, and water solubility. The results of these tests are given in Table 1.

TABLE 1

| Example No. | 1 | 1 | 1 | 2 | 2 | 2 | 3 | 4 | 5 | 6 |
|---|---|---|---|---|---|---|---|---|---|---|
| Binder | Starch | PVOH | PVOH | Starch | PVOH | PVOH | Starch | Starch | Starch | Starch |
| Weight Percent Binder | 30 | 15 | 30 | 30 | 15 | 30 | 30 | 30 | 30 | 30 |
| Composite Black Optical Density | 0.98 | 0.9 | 0.9 | 1.22 | 1.11 | 1.22 | 1.15 | 1.14 | 1.02 | 1.03 |
| True Black Optical Density | 1.17 | 1.34 | 1.31 | 1.31 | 1.36 | 1.54 | 1.22 | 1.25 | 1.53 | 1.4 |
| Spreading | 106.2 | 101.3 | 100.2 | 108.4 | 101.6 | 100.8 | 107.7 | 106.6 | 101 | 103.5 |
| Penetration | 30.3 | 34.5 | 32.7 | 8.4 | 25.7 | 21.8 | 20.9 | 12.1 | 19.1 | 23.3 |
| Dry Time | 0 | 0 | 0 | 22 | 0 | 17 | 11 | 21 | 104 | 50 |
| Water Solubility | 0 | 0.02 | 0.02 | 0.15 | 0.02 | 0.07 | 0.08 | 0.12 | 0.45 | 0.32 |

These results demonstrate a significant improvement when compared to a typical uncoated commercial paper, which, typically, has a composite black optical density of about 0.9, a true optical density of about 1.28, spreading of about 108, a percent penetration of about 38, a drying time of about 38, and a water solubility of about 0.17. By comparison, the best high cost, coated commercial paper has a composite black optical density of about 1.2, a true black optical density of about 1.56, spreading of about 98, a percent penetration of about 28, a drying time of about 12, and a water solubility of nearly 0. Therefore, an ink jet recording paper produced according to the present invention, and, in particular, a paper that is coated with a formulation based on the PCC produced in Example 2, is comparable in ink jet print quality to the best high cost commercial paper now available.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

I claim:

1. An inkjet recording paper comprising a paper base stock, having thereon a coating comprising a heat aged precipitated calcium carbonate pigment, and a binder, said pigment produced by heat aging a slurry of precipitated calcium carbonate particles in the presence of an effective amount of an organophosphonate compound to control the extent or degree of heat aging.

2. The ink jet paper of claim 1, wherein the heat aged precipitated calcium carbonate pigment has a BET specific surface area of at least about 60 $m^2/g$.

3. The ink jet recording paper of claim 1, wherein the binder is polyvinyl alcohol or a starch.

* * * * *